United States Patent [19]

Schmale et al.

[11] Patent Number: 5,360,272
[45] Date of Patent: Nov. 1, 1994

[54] RUNNING RAILS FOR MOTOR VEHICLE SEATS

[75] Inventors: Gerhard Schmale, Hückeswagen; Norbert Sommer, Wermelskirchen, both of Germany

[73] Assignee: Naue/Johnson Controls Engineering GmbH & Co., Germany

[21] Appl. No.: 24,992

[22] Filed: Mar. 2, 1993

[30] Foreign Application Priority Data

Mar. 3, 1992 [DE] Germany .................... 4206650

[51] Int. Cl.⁵ .............................. F16C 29/04
[52] U.S. Cl. ........................ 384/48; 384/13; 384/34
[58] Field of Search ............ 384/9, 13, 34, 48, 18, 384/19, 17; 296/65.1

[56] References Cited

U.S. PATENT DOCUMENTS

| 4,756,503 | 7/1988 | Fujita ............................ 384/34 |
| 4,901,421 | 2/1990 | Takarabe et al. .................. 384/34 |
| 5,207,473 | 5/1993 | Nawa et al. ..................... 296/65.1 |
| 5,224,781 | 7/1993 | Rohee ............................ 384/34 |

Primary Examiner—Lenard A. Footland
Attorney, Agent, or Firm—Leonard J. Kalinowski; E. L. Levine; Joseph E. Root, III

[57] ABSTRACT

Running rails for securing a motor vehicle seat to a motor vehicle and permitting fore and aft movement of the seat in the direction of the longitudinal axis of the vehicle, including cooperating upper and lower rails each consisting only one profiled member, the lower rail having a generally U-shaped cross section with upwardly extending limbs having upper ends which are bent over forming inwardly extending arcuate parts which define first portions of first and second ball bearing raceways, the upper rail having a wedge shaped portion defining second portions of the first and second ball bearing raceways, and bottom web portions of the upper and lower rails being spaced apart defining a track for roller bearings.

14 Claims, 1 Drawing Sheet

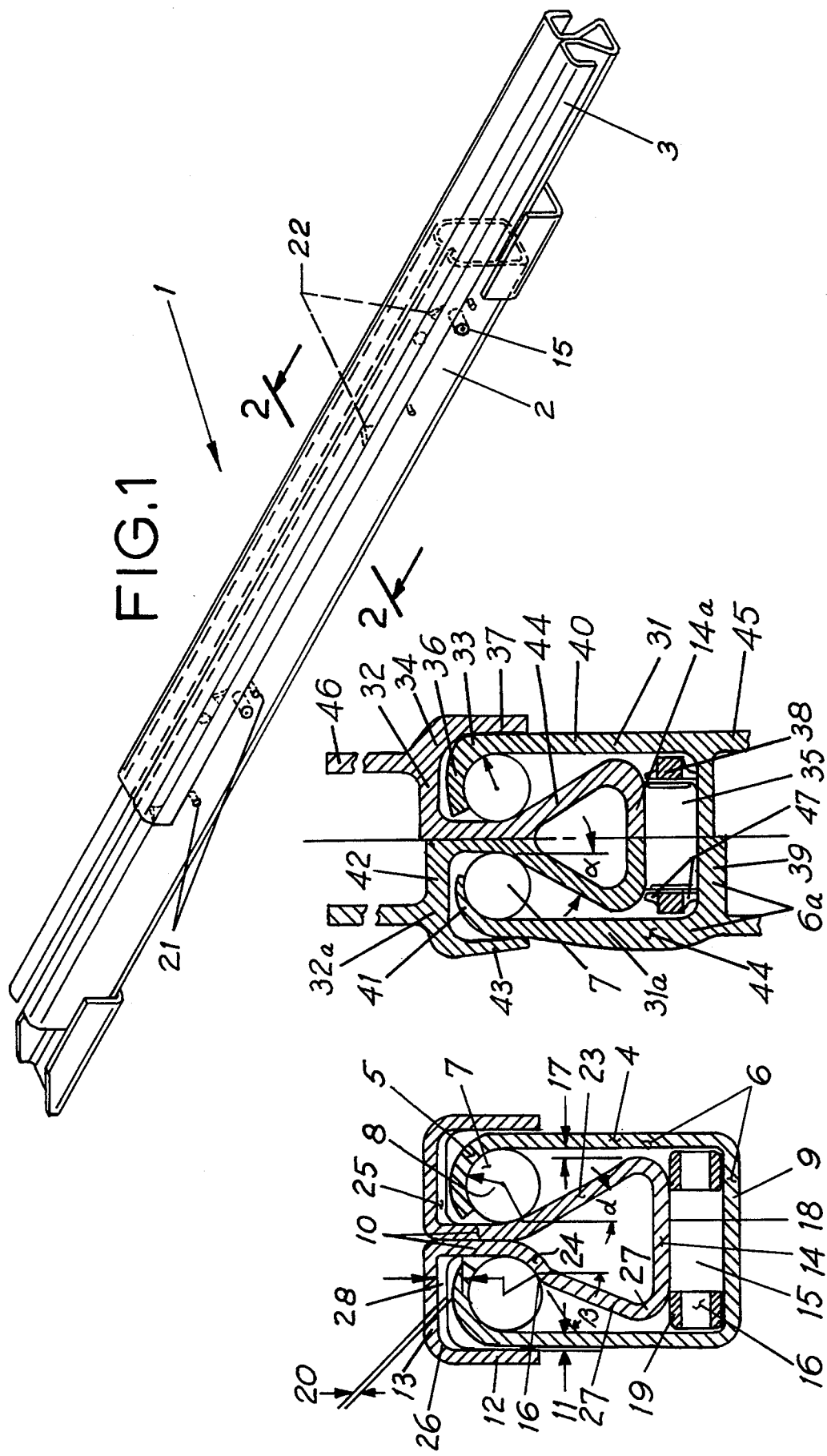

RUNNING RAILS FOR MOTOR VEHICLE SEATS

BACKGROUND OF THE INVENTION

It is known to mount motor vehicle seats on running rails on both outer sides so that the position of the seats can be changed stepwise in the direction of the longitudinal axis of the vehicle.

However, these known designs are very expensive, are heavy, and are not particularly strong, especially in respect of ability to withstand the loads arising in a crash without breaking. They are sensitive to jamming, which however cannot always be avoided in the case of such parts made without the use of machining, and the tolerances of the points of attachment also leave much to be desired.

Thus in the case of a seat rail according to German patent 32 26 585 the two associated profiled rods are made by fitting together two pairs of sections, and only rollers are used for rolling bearings to take the downward loading. This leads to high cost and also to the condition of high sliding friction arising when there is upward loading. This often comes about as a result of the moment that arises when the support occurs in the front or rear region of the guide means as a result of forces acting high up due to the person seated leaning back against or pulling on the backrest. There is then no rolling bearing action, and consequently the adjustment is stiff, above all if lateral forces have to be withstood as well.

The object of the invention is to provide a running rail of the kind referred to having a lower rail part and an associated upper rail part of lightweight construction, that offer high stability, easy running properties and insensitivity to tilting and consequently problem-free mounting.

The advantages obtained with the invention are essentially that in a running rail for motor vehicle seats full rolling bearing support is provided for the loading acting upwardly, downwardly and also in directions inclined thereto, and that the upper and lower rail parts provide mutual support in their upper regions in the case of high loadings, so that the tendency to gape apart is countered at low cost.

An exemplary embodiment of the invention is illustrated in the drawings and will now be described in more detail.

DESCRIPTION OF THE DRAWINGS

FIG. 1 shows a diagrammatic perspective overall view of the subject of the invention;

FIG. 2 shows a section on the line 2—2 in FIG. 1 using profiled parts pressed from sheet metal; and FIG. 3 shows a section as in FIG. 2 but using extruded profiled parts.

DESCRIPTION OF PREFERRED EMBODIMENTS

A running rail 1 comprises, as shown in FIGS. 1 and 2, a lower rail part 2 connected to the floor of the vehicle (not shown) and an upper rail part 3 inserted therein.

The lower rail part 2 is a profile formed from sheet steel without machining and consists essentially of a U-section 6 in which the upper ends of the limbs 4 are formed inwardly with a radius 8 to form respective part-circular parts 5 that fit balls 7 on which they bear. These part-circular parts 5 only extend so far inwardly that they do not collide with the upper rail part 3 when this is inserted.

The upper rail part 3 is likewise made, as shown, as a profiled section formed from sheet without machining.

Two outer limbs 12 of the upper rail part 3 laterally surround the upper outer parts of the U-section 6 of the lower rail part 2 with clearance 11. The profile then extends horizontally inwardly on both sides, likewise with clearance 20 from the part-circular parts, to meet in the middle, and then downwardly as a common middle limb 10 until tangential contact is made with the balls 7, after which, as shown in FIG. 2 on the right hand side, each of these two parts fits at a radius 8 around the respective ball 7 and extends outwardly at an angle a of about 30°, in order finally to lead outwards as a split web 23 and then, at a distance 17 from the limbs 4 of the lower rail part 2, to be radiused into a horizontally extending region 14. The lower outer surface of this region 14 is provided as track 18 for the rollers 15 that are inserted between it and the web 9 of the lower rail part 2 to serve as lower rolling bodies for the running rails.

A guide cage 19, supported in the interior of the lower rail part 2, can be journalled on necks 16 at the ends of the rollers 15. Alternatively the guide cage 19 can guide the rollers without journalling on necks 16. The tracks of the rollers 15, like those of the balls 7, are bounded at both ends in known manner by insertable stops, e.g. pins 21 or parts 22 stamped out of the material of the profile, so that these rolling bodies can always assume their optimum rolling path, spaced apart from one another independent of other influences such as vibration, skewing or the like.

To increase the bending strength of the webs 13 in the upward direction, and hence also the resistance of the limbs 12 to bending upwards, stiffening corrugations 25 can be pressed into the web 13 towards the inside, merging into the middle limb 10 and the limb 12 with fairly large runouts 26 that reach to near the part-circular part 5. In addition it is advantageous to make the bend of the middle limb 10 to the webs 13 with a small radius, almost as a sharp corner. The two parts thus cross one another at a fairly great distance 28 apart in this region, which increases the resistance to bending.

The limb regions 24 descending after the middle limb 10 can also exhibit a greater ball bearing contact if they are bent out at an angle $\beta$ of 45° or more, as shown in the left hand illustration, thereby reducing the tendency of the upper rail part 3 to burst the lower rail part 2 outwards at high loadings. After a bend 26, split webs 27 then lead obliquely downwards, not going beyond the distance 17, after a bend 26, to terminate, through the lower bend 27' in the region 14.

The running rails 30, consisting of extruded profiles with the cross-sections shown in FIG. 3, correspond functionally to the running rails of FIGS. 1 and 2, so that there is no need to discuss them in more detail. The lower rail part 31, which is likewise formed essentially as a U-section 6a, and the upper rail part 32, can consist of mild steel or light metal, and the individual parts of the cross section can be adapted to the stresses in particular ways as regions of the section with same bending strength. Thus in the case of the right hand illustration the transition 33 to the part-circular part 36 of the limb 40 of the lower rail part 31 is correspondingly thickened and further on is thinned, with suitably adapted transitions, and likewise the transition 34 to the outer limb 37 of the upper rail part 32.

The split webs 44 run, as shown, outwardly at an angle α of about 30° from the point of contact with the balls 7. Here, too, a larger angle can be used.

The roller 35 is in the form of a simple cylindrical member and is guided by the cage 38 around it, which is supported by its feet 47 in the interior space formed by the lower rail parts 31 and upper rail parts 32.

In the left hand illustration of FIG. 3 the cross-sections of the profile regions are shaped according to the principles of bodies of the same bending strength. This refers both to the web 39 and to the adjoining limb 44 inclusive of the part-circular part 41 of the lower rail part 31a and also to the web 42 and the laterally outer limb 43 of the upper rail part 32a.

The tabs 45 and 46 of the lower rail parts 31, 31a and the upper rail parts 32, 32a serve for connection of floor sections or seat parts respectively, corresponding to the respective fitting requirements.

Though the shapes of the lower rail parts 2, 31, 31a ad the upper rail parts 3, 32, 32a, together with the balls 7 and rollers 15 or 35 inserted therein, a rolling bearing support is always provided for the relative displacement of the profiles, irrespective of whether the loading is acting upwards, downwards or sideways.

Thus in the front and rear regions of the rails the direction of loading is always reversed through the moment which is exerted against the back rest by the person seated leaning on it or on the back rest by pulling by way of the safety belt.

Under lighter loading the split webs 23 and 27 of an upwardly loaded upper rail part 3 or 32 are deformed elastically inwardly through the angles α and β respectively and the limbs 4 or 40 of the respective lower rail parts 2 or 31 are bent elastically outwardly, so that they bear on the limbs 12 or 37 and 43 respectively and thereby accept the loading without damage.

In case of a crash the profile parts bearing on one another, the limbs 4, 40 or 44 against the limbs 12, 37 or 43 respectively, provide a yielding support, i.e. one that does not break and destroy the parts.

We claim:

1. Running rails (1) for motor vehicle seats by means of which these can be moved and secured, formed of cooperating profiled rails, characterised in that the lower rail part (2) consists of a U-section (6, 6a) of which the limbs (4, 40, 44) continue on both sides of the open top with a radius (8) for fitting contact with balls (7) as inwardly extending part-circular parts (5, 36, 41) and that the upper rail part (3, 32) consists of a profile that surrounds the upper region of the lower rail part (2, 31, 31a) through lateral limbs (12, 37, 43) located on the outside which are then formed as upper webs (13, 42) leading to the middle, with respective clearances (11, 20), the latter webs running downwardly in contact or integrally with one another as a middle limb (10) to make tangential contact with the balls (7) and then spreading out at an angle (α, β) of 30° to about 75° as a split web (23) to surround respective limb regions (24) or limbs (44) as counter tracks to the balls (7), in order then to lead downwardly, outwardly and sideways up to a distance (17) from the lower rail part (2, 31), and then by each bending horizontally inwardly to form a region (14, 14a) the bottom of which is the track (18) for rollers (15, 35) between and in contact with it and the web (9) of the lower rail part (2).

2. Running rails according to claim 1, characterised in that the webs (13) are provided in the inside with a plurality of corrugations (25) lying on the inside and distributed over their length, whose run-outs (26) both to the limbs (12) and to the parts of the middle limb (10) extend to close to the part-circular parts (5).

3. Running rails according to claims 1 and 2., characterised in that the running rails (1) and the lower rail part (2) are sheet steel pressings or drawn parts made without machining.

4. Running rails according to claim 1, characterised in that the rollers (15) have outer necks on which are journalled guide cages (19) that are supported on the inside on the lower rail part (2), or that running rollers (35) are associated with guide cages (38).

5. Running rails according to claim 1, characterised in that the lower rail part (31, 31a) and the upper rail part (32, 32a) are made as extrusions from mild steel or light metal, the cross sections, such as those of the part-circular part (36), the transition (34), the limb (24), the part-circular part (41), the web (42) and the limb (43) being formed in the sense of beams of equal bending strength.

6. Running rails for securing a motor vehicle seat to a motor vehicle and permitting fore and aft movement of the seat in the direction of the longitudinal axis of the vehicle, said running rails comprising: cooperating lower and upper profiled rails, said lower rail having a generally U-shaped cross section including upwardly extending limbs having lower ends joined by a lower web which defines the bottom of said lower rail, and having upper ends which are bent over, forming inwardly extending arcuate parts which define portions of first and second ball bearing raceways, said upper rail part having lateral downwardly extending limbs which surround the upper portion of said lower rail, said lateral limbs being located on the outside of said upper extending limbs of said lower rail and having inwardly directed upper webs with respective clearances relative to said arcuate parts of said lower rail, said lateral webs extending downwardly in contact with one another defining a middle limb and then spreading out at an angle defining split web portions which extend downwardly and outwardly, sideways, toward said limbs of said lower rail, but spaced from said limbs of said lower rail, said split web portions having lower ends which are connected together by a horizontally extending web portion which defines the bottom of said upper rail, and said bottom of said lower rail and said bottom of said upper rail defining a track for rollers located between and in contact with said web of said lower rail.

7. Running rails according to claim 6, wherein said upper webs of said upper rail are provided with a plurality of corrugations on inside surfaces thereof and which are distributed over the length of said inside surfaces of said upper webs, said corrugations having run-outs both to said lateral limbs of said upper rail and to said middle limb, and extending adjacent to said arcuate parts.

8. Running rails according to claim 6, wherein said upper running rail and said lower running rail are pressed from sheet steel and are made without machining.

9. Running rails according to claim 6, wherein said rollers have outer necks on which are journalled guide cages that are supported on the inside of said lower rail.

10. Running rails according to claim 6, wherein said lower rail and said upper rail are extruded from mild steel or light metal.

11. Running rails according to claim 6, wherein said upper running rail and said lower running rail are formed without machining.

12. Running rails according to claim 6, wherein said rollers are associated with guide cages.

13. Running rails according to claim 6, wherein portions of said lower rail including said lower web, said upwardly extending limbs and said arcuate part and portions of said upper rail including said upper web and said lateral limbs are formed in the sense of beams of equal bending strength.

14. Running rails according to claim 6, wherein said split web portions of said lateral webs spread out at an angle in the range of about 30° to about 75°.

* * * * *